J. Albro.
Printing Oil Cloths.
No. 992. Reissued Jul. 3. 1860.
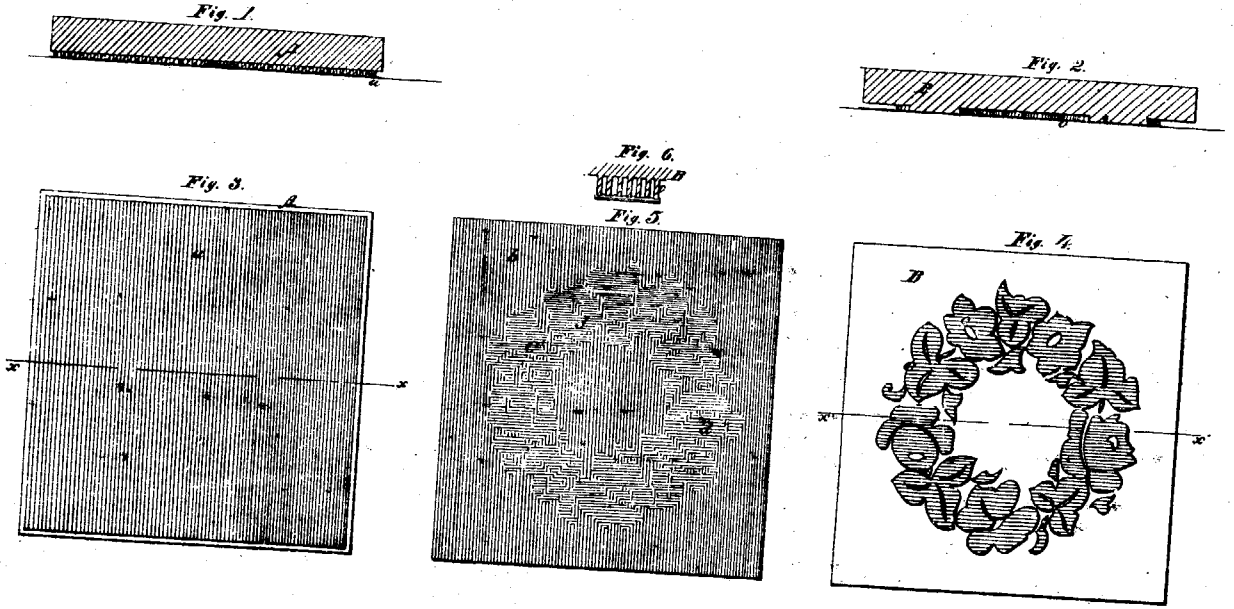
Witnesses,
O. F. Tisch
B. W. Ely
Inventor,
James Albro

UNITED STATES PATENT OFFICE.

JAMES ALBRO, OF ELIZABETH, NEW JERSEY.

IMPROVEMENT IN PRINTING OIL-CLOTHS.

Specification forming part of Letters Patent No. 24,270, dated June 7, 1859; Reissue No. 992, dated July 3, 1860.

*To all whom it may concern:*

Be it known that I, JAMES ALBRO, of Elizabeth, in the county of Union and State of New Jersey, have invented a new and useful Improvement in the Printing of Oil Cloths; and I do hereby declare that the following is a full, clear, and exact description of the same, reference being had to the annexed drawings, making a part of this specification, in which—

Figures 1 and 2 are transverse sections of the blocks used to produce my improvement, taken, respectively, in the lines *x x x′ x′*, Figs. 3 and 4; Figs. 3 and 4, face views of the same; Fig. 5, a face view of a piece of oil-cloth printed according to my invention; Fig. 6, an enlarged section of a block.

Similar letters of reference indicate corresponding parts in the several figures.

The object of this invention is to give to the surface of oil-cloth a new and ornamental effect resembling damask. To this end I form the ground and figure of the oil-cloth by means of parallel ridges or raised lines, the ridges or lines of the figure being at right angles to those of the ground, so that the desired effect will be produced by the action of light.

In carrying out this invention it is not essential that different colors be employed—that is to say, the ground and figure may be printed with the same color, as the effect is obtained by the different positions of the lines or ridges of the ground and figures—still, different colors may be employed, and the same effect obtained, and in certain styles of figures a variety of colors would be preferable.

A, Figs. 1 and 3, represents a block, constructed of the usual material, of any proper size, and having its face formed of a series of parallel ridges or raised surfaces, *a*, produced by cutting out spaces of suitable width between them. The ridges or raised surfaces extend the whole width of the block, and may cover its entire surface if one color only is to be used in the process of printing. This block may be termed the "ground-block," as it used to raise the ground tint into ridges, as shown at *b* in Fig. 5, the ridges *b* corresponding, of course, to the spaces between the raised ridges or surfaces *a* on the block A. The block A is pressed on the ground tint or color by means of the usual press, and the ground color is placed on the canvas in the usual or in any proper way. It will be seen that the block A is necessarily used when the ground color or tint is green or soft, in order that the necessary ridges *b* may be formed. When the ridges *b* are formed, and while the ground color is still green or soft, the block B, Figs. 2 and 4, is pressed on it. This block B has the design or ornamental configuration C on its face side in relief. (See Fig. 4.) The design C is formed by parallel ridges or raised surfaces *c*, which run at right angles with those, *b*, of the block A, and consequently the figure C′ in Fig. 5 is produced by ridges or raised surfaces *d* at right angles to *b*. When the block B is pressed on the green or soft tint previously ridged by the pressure of the block A, the desired configuration is produced with one color only, the effect being due to the action of the light on the ridged or raised surfaces. In cases where the figure is of a different color from the ground, the block A has portions of its surface cut out corresponding to the figure, so that one color will not interfere with another, each block A B ridging its peculiar color or ground tint, which may be placed on the cloth in the usual way, each block requiring a separate ground or color.

It will readily be seen that as the damask effect is produced by the reflection of light from the lined surfaces of the ground and figure running in contrary or reverse directions, that color does not effect the result. A variety of colors, however, may in certain cases be very desirable, for certain styles of figures may require them, but the same damask effect, when the ground and figure are ridged or lined in reverse directions will be obtained.

I would remark that although both blocks have been described as being formed of parallel ridges, still one of them may have broken ridges or dots, and a similar effect will be obtained.

I am aware that oil-cloths have been printed with blocks having ridges running in opposite directions, but, so far as I am aware, those blocks were only used for printing surfaces in separate and distinct parts of the cloth, as in checks or squares bounded by an outline, one part having no connection with the other, and forming no contrast with each other as regards figure and ground. I do not claim, therefore, broadly, printing oil cloth by means of block cut in lines which run in different directions; but I do claim as new and desire to secure by Letters Patent—

Forming ornamental figured surfaces on oil-cloths by raising at right angles with each other, by means of properly-prepared blocks, parallel ridges or surfaces *b d*, substantially as described, to form by the action or reflection of light, and with or without a plurality of colors, the damask ground and figure, it being understood that I claim the privilege of having either the ground or figure, one only, if desired, composed of dots or broken lines, in order to obtain a similar effect.

JAS. ALBRO.

Witnesses:
W. TUSCH,
CHAS. HUGHES.